(12) United States Patent
Eriksson (10) Patent No.: US 12,536,311 B2
(45) Date of Patent: Jan. 27, 2026

(54) PROVIDING A SHARE STATEMENT LINKED TO A DIGITAL IDENTIFIER OF AN IMAGE

(71) Applicant: Sasha ApS, Odense (DK)

(72) Inventor: Thomas Alexander Krause Eriksson, Odense (DK)

(73) Assignee: Sasha ApS, Odense (DK)

( * ) Notice: Subject to any disclaimer, the term of this patent is extended or adjusted under 35 U.S.C. 154(b) by 625 days.

(21) Appl. No.: 17/857,905

(22) Filed: Jul. 5, 2022

(65) Prior Publication Data
US 2024/0330490 A1 Oct. 3, 2024

Related U.S. Application Data

(60) Provisional application No. 63/220,173, filed on Jul. 9, 2021.

(51) Int. Cl.
*G06F 21/62* (2013.01)

(52) U.S. Cl.
CPC ................. *G06F 21/6209* (2013.01)

(58) Field of Classification Search
CPC ..... G06F 21/6209; G06F 21/16; H04W 12/02
See application file for complete search history.

(56) References Cited

U.S. PATENT DOCUMENTS

| | | | |
|---|---|---|---|
| 5,889,868 A | 3/1999 | Moskowitz et al. | |
| 7,426,750 B2 * | 9/2008 | Cooper | G06Q 10/10 726/28 |
| 8,300,877 B2 * | 10/2012 | Jonsson | H04N 1/32213 358/3.28 |
| 9,378,386 B1 * | 6/2016 | Saylor | G06F 21/6209 |
| 2008/0199040 A1 * | 8/2008 | Jonsson | H04N 1/32315 382/100 |
| 2011/0051173 A1 * | 3/2011 | Yagishita | G06K 15/02 358/1.14 |
| 2011/0080958 A1 | 4/2011 | Sprljan et al. | |
| 2012/0047103 A1 * | 2/2012 | Marecki | H04L 63/1416 709/224 |
| 2012/0066767 A1 * | 3/2012 | Vimpari | G06Q 20/3821 726/26 |

(Continued)

FOREIGN PATENT DOCUMENTS

| | | | | |
|---|---|---|---|---|
| CN | 108549796 A | * | 9/2018 | ............. G06F 21/16 |
| CN | 109151157 A | | 7/2021 | |

(Continued)

*Primary Examiner* — Ted W Barnes
(74) *Attorney, Agent, or Firm* — Brokaw Patent Law, PC; Christopher J. Brokaw (57) ABSTRACT

Approaches for a service provider to act according to auxiliary information that includes a share statement linked to an image. A user uploads an image to the service provider. The service provider sends the image to a server system that comprises a registry with a plurality of one or more digital identifier keys linked to auxiliary information including at least a share statement. The server system searches in the image for one or more encoded digital identifiers as a function of the one or more digital identifier keys. When the server system identifies a digital identifier in the image, the server system sends at least the share statement of the image to the service provider so that the service provider may act in accordance with the share statement.

11 Claims, 9 Drawing Sheets

(56) References Cited

U.S. PATENT DOCUMENTS

| | | | |
|---|---|---|---|
| 2013/0247220 A1* | 9/2013 | Bingell | G06F 21/6245 |
| | | | 726/28 |
| 2013/0308817 A1* | 11/2013 | Konkel | H04W 4/21 |
| | | | 382/100 |
| 2014/0019765 A1* | 1/2014 | Montalvo | G06F 21/6218 |
| | | | 713/176 |
| 2014/0282921 A1* | 9/2014 | Filman | G06F 21/62 |
| | | | 726/5 |
| 2014/0289518 A1* | 9/2014 | Sinha | H04L 63/04 |
| | | | 713/165 |
| 2014/0351541 A1* | 11/2014 | Angelo | G06F 3/0659 |
| | | | 711/163 |
| 2017/0099149 A1* | 4/2017 | Eber | H04L 63/0281 |
| 2017/0270630 A1* | 9/2017 | Creusen | H04N 23/56 |
| 2017/0329937 A1 | 11/2017 | Choi et al. | |
| 2019/0318067 A1* | 10/2019 | Chappelier | G06F 21/16 |
| 2020/0380090 A1* | 12/2020 | Marion | G06F 21/6209 |
| 2021/0152600 A1 | 5/2021 | Cheng et al. | |
| 2023/0351032 A1* | 11/2023 | Chen | G06F 21/6209 |
| 2024/0005009 A1* | 1/2024 | Khanal | G06F 21/6209 |

FOREIGN PATENT DOCUMENTS

| | | | | |
|---|---|---|---|---|
| CN | 109151157 B | * | 7/2021 | H04M 1/72463 |
| JP | 2017532636 A | * | 11/2017 | H04N 7/183 |

\* cited by examiner

PROVIDING A SHARE STATEMENT LINKED TO A DIGITAL IDENTIFIER OF AN IMAGE

CLAIM OF PRIORITY

This application claims priority to U.S. Provisional Patent Application Ser. No. 63/220,173, filed Jul. 9, 2021, invented by Thomas Alexander Krause Eriksson, entitled "System for Providing a Share Statement Linked to a Digital Identifier of an Image," the entire contents of which are hereby incorporated by reference for all purposes as if fully set forth herein.

FIELD OF THE INVENTION

Embodiments of the invention relate to approaches for identifying an image.

BACKGROUND OF THE INVENTION

There is an ever-increasing number of images and videos available on the Internet. Such images and videos may be hosted by various service providers including but not limited to companies such as Facebook, Snapchat, Alphabet, Twitter, and Reddit.

Often, there are several copies or partial copies of the very same image across service providers, or even at the same service provider. This is not a problem in and of itself as there are many reasons why a person or company may actively choose to have an image or video posted, hosted, or otherwise publicly available at multiple locations on the Internet.

The Internet allows for the easy sharing of images and videos, even for those images and videos which were never intended to be shared in a widespread or public manner. When images and videos are widely shared across the Internet, it is almost impossible to identify the initial actor or actors who were responsible for their distribution. Images and/or videos may be shared over the Internet intentionally, accidentally, or in bad faith, such as when a third party creates a fake profile at a service provider of an influencer in the effort to abuse the good will of the influencer.

Since it is easy to share and distribute images on the Internet, it is hard to enforce the right to be forgotten as recognized and practiced in the European Union. This is partly due the amount of computational power it would require to compare one single image of interest against the ever-growing number of many millions of other images scattered across the Internet.

Accordingly, it is in practically impossible to retract an image from the Internet after it has spread; however, the need exists for preventing or limiting the spreading of images across various Internet service providers, which constitute the chief source from which most users access digital content on the Internet.

DETAILED DESCRIPTION OF THE INVENTION

Approaches for identifying an image using a share statement are presented herein. In the following description, for the purposes of explanation, numerous specific details are set forth to provide a thorough understanding of the embodiments of the invention described herein. It will be apparent, however, that the embodiments of the invention described herein may be practiced without these specific details. In other instances, well-known structures and devices are shown in block diagram form or discussed at a high level to avoid unnecessarily obscuring teachings of embodiments of the invention.

Embodiments of the invention provide a share statement linked to a digital identifier of an image. Embodiments allow entities such as a service provider to act according to an auxiliary information identified by a share statement linked to the image.

A system of an embodiment comprises at least one sender device and a server system. This system may be used to provide auxiliary information linked to an image encoded with one or more digital identifiers.

Each sender device comprises a communication module and an encoding module. The encoding module of a sender device is adapted to encode an image with one or more digital identifiers and to create one or more digital identifier keys.

The sender device is configured to perform the following when uploading an image to a recipient: (1) encode the image with one or more digital identifiers, thereby creating an encoded image, (2) create one or more digital identifier keys of the encoded image as a function of the one or more digital identifiers, (3) create auxiliary information that includes at least a share statement, (4) link the auxiliary information to the one or more digital identifier keys, (5) send the one or more digital identifier keys and auxiliary information to the server system, and (5) upload the encoded image to the recipient.

The server system of an embodiment comprises a registry. This registry comprises a plurality of digital identifier keys linked to the auxiliary information. When receiving a request image from a requester, the server system is configured to (1) search the request image for encoded digital identifiers as a function of the plurality of digital identifier keys, and (2) send at least the share statement linked to the digital identifier key to the requester.

In an embodiment, the server system may store information related to the image. In this way, the server system becomes a centralized server enabling at least in principle any requester to receive auxiliary information linked to an image via the digital identifier. The requester may not or need not receive all auxiliary information in an embodiment; however, the requester will at least receive the share statement.

In an embodiment, the share statement may be selected from the following non-exhaustive, exemplary list of share statements: (1) all sharing allowed, (2) all sharing allowed—image may not be used for profile picture, (3) all sharing allowed—image may only be used for profile picture for the following accounts and handles (followed by a list of accounts and handles), (4) all sharing allowed at a specific service provider, otherwise no sharing allowed, (5) no sharing allowed, and (6) image is confidential—no sharing allowed. The non-exhaustive, exemplary list of share statements enables a user or owner of the at least one sender device to give global instructions to all service provides as each service provider can separately be a requester requesting auxiliary information for an image. As an example, the share statement "all sharing allowed—image may not be used for profile picture" will reduce the risk of creating fake profiles aiming to abuse the good will of an influencer, where the fake profile poses as the influencer.

The sender device may be a smart device, a smart phone, a tablet, a laptop, or a computer device, as an example. The sender device comprises the communication module for communicating with the server system and the recipient.

The communication module may be configured to communicate via Bluetooth and/or Wi-Fi, and/or using band cellular network technology such as 4G or 5G, and/or via a wired connection such as an Ethernet cable.

The sender device also comprises the encoding module, which is adapted to encode an image with one or more digital identifiers and to create one or more digital identifier keys. Thus, the encoding module may encode the image with one or more digital identifiers and create one or more digital identifier keys of the encoded image as a function of the one or more digital identifiers. The two steps described above may be performed simultaneously by the encoding module.

The encoding module may be a processor and/or a GPU or a dedicated unit designed to encode images with one or more digital identifiers.

In the present application, the term image in the singular is to be interpreted as and encompass both a single image (i.e., a photo) and as a series of images (i.e., a video or a gif).

A digital identifier will be discussed below in greater detail. However, it should be appreciated that a digital identifier may be metadata and/or a digital watermark encoded into the image. The digital identifier is essentially a pattern, which the digital identifier key will enable a computer such as the server system to recognize faster and more energy efficient compared to not having digital identifier key.

Furthermore, searching for a digital identifier such as a watermark in an image using a digital identifier key is computational more energy efficient than comparing whether two images are identical since a 4K image contain 3840×2160 pixels, while the digital identifier is contained in a subset of the image which can be recognized with less computation time since less data is used for the evaluation. This enables the server system to efficiently search the request image for encoded digital identifiers as a function of the plurality of the identifier keys.

Furthermore, a digital identifier such as a digital watermark will also enable identification of a cropped image, where most of the image has been removed. As an example, the image shown in FIG. 9B could be changed by removing or replacing the background or part of the face, which will make it more difficult to perform a compare operation against using the image shown in FIG. 9A. However, the digital fingerprint will still be part of one or more subsets of the image, which the server system with the corresponding digital key will be able to recognize. Thus, the server system would be able to provide at least the share statement even if the image has been modified.

The requester sending the request image to the server system could in theory be any natural person or any legal person. However, in practice there may be non-technical reasons for not enabling any natural person or any legal person to request a share statement, e.g., the non-technical reason may be the General Data Protection Regulation (GDPR) rules of the European Union or other national laws or other federal laws.

The act of sending at least the share statement linked to the requester digital identifier key to the requester may include other parts of the auxiliary information depending on the level of security set by the original sender and/or the identity of the requester.

In an embodiment, the auxiliary information includes at least one or more of the following: (1) recipient identifier (ID), (2) contact details of the recipient, (3) sender ID, (4) contact details of the sender, and (4) user names or handles to one or more social medias linked to the sender device.

The sender ID and the contact details of sender refer to the owner or the user of the sender device. The owner or the user of the sender device may be a natural person or legal person. Likewise, the recipient ID and the contact details of the recipient refer to the natural person or legal person being the recipient.

The list of the auxiliary information is not an exhaustive list of all possible auxiliary information. Auxiliary information may include any information which can be used by the server system to notify the owner or user of the sender device that the image has been identified based on an image received by a requester. In the case, when the requester is a service provider, then this information may be sent to the owner or the user of the sender device.

In an embodiment, the recipient is a service provider and the encoded image is publicly available at the service provider. For example, the service provider may be Reddit, an open online forum, Instagram, YouTube, or any other service provider having publicly available images provided by users. Even though the encoded image may have been properly and intentionally uploaded to one service provider, it does not necessarily follow that the owner or user of the sender device is desirous of or agreeable to the image being shared on other websites or apps provided by other service providers.

The sharing of the image can be limited by choosing a specific share statement linked to the one or more digital identifiers and informing any service provider not to share the encoded image. Consequently, for use of an embodiment, the owner or user of the sender device will be able to communicate indirectly with any service provider through the registry at the server system.

In an embodiment, the system may link the recipient to a confidential image encoded with one or more digital identifiers. Encoding the image with one or more digital identifiers may optionally include one or more recipient-unique digital identifiers, thereby creating a recipient-unique encoded image. Also, the process of creating auxiliary information may optionally include a recipient ID enabling identification of the recipient.

The image to be sent to the recipient may contain confidential information, such as, but not limited to, an image of a prototype for a new product to be launched or picture of a nude person. In the first case, the sharing of the confidential information may cause lost revenue since it may not be possible to file for a patent or design patent. In the second case, the sharing of the confidential information may cause personal distress for the person in the image. In both cases, it can be very difficult to prove that the recipient has acted in bad faith and/or at least has breached a confidentiality obligation since the image may have been sent to a series of recipients or the image could have been uploaded by owner or user of the sender device.

Thus, the recipient-unique encoded image having digital identifiers unique for the recipient, and thus recipient-unique digital identifier keys linked to the auxiliary information that includes recipient ID, enables identification of the recipient. In this way, the system may be used in forensics for evidencing that the image is the recipient-unique encoded image and thus must have been leaked from the recipient.

Under national law or federal law. the recipient may have to approve the logging of the recipient ID.

In an embodiment of the invention, the sender device is configured to receive user input about one or more areas of the image. The process of encoding the image with one or more digital identifiers may use that user input by encoding the one or more digital identifiers in the areas of the image identified by the user input.

The sender device may be configured to receive user input through a touchscreen or similar input mechanism such that a user can mark which areas of the image must include at least one digital identifier. This may be relevant in the case of a prototype for a new product or a nude person. In the case of the nude person, the areas of the image may the area of a genitalia or breasts or any other area which is deemed sensitive to the user providing the user input.

In an embodiment of the invention, the one or more digital identifier keys enable identification of at least one or more of the following (1) metadata of the image, (2) a human-visible watermark encoded in the image, (3) a Discrete Wavelet Transform (DWT) watermark encoded in the image, and (4) a Discrete Cosine Transform (DCT) watermark encoded in the image.

The metadata of the image and the human-visible watermark will, for a person acting in bad faith, be relatively easy to remove; however, the DWT watermark and DCT watermark will be near impossible to remove for the average person.

In an embodiment, the server system performs an act of changing the auxiliary information linked to one or more digital identifiers as function of a request from an owner of the sender device.

The owner or user of the sender device may, due to the information received by the server system, wish to change the share statement of the encoded image. This may be prompted by a notification from the server system informing that the image has been shared or that the share statement linked to a digital identifier of the encoded image has been requested indicating that unknown third parties are sharing the encoded image.

Embodiments of the invention enable a service provider to act according to the auxiliary information including the share statement linked to an image. After a user has uploaded an image to the service provider; the service provider may (1) send the image to a server system comprising a registry with a plurality of one or more digital identifier keys linked to auxiliary information including at least a share statement, (2) search in the image for one or more encoded digital identifiers as a function of the one or more digital identifier keys, and (3) upon identifying a digital identifier, sending at least the share statement of the image to the service provider.

A service provider that receives an image from a user may check whether the image has a share statement restriction by sending the image to the server system. In turn the server system may perform the search for digital identifiers using the image and, upon finding the digital identifier associated with the image, the server system may provide the at least the share statement of the image to the service provider. Thereby, the service provider will be able to act according to the share statement. This will in effect limit the sharing of the image.

In embodiment, the server system may, as a function of the auxiliary information linked to the digital identifier, alert a sender having encoded the image with digital identifiers. The sender may be the owner or user of a sender device.

In other embodiments, the server system may search for digital identifiers linked to images having a share statement being confidential or takedown or the like, where the server system sends takedown requests to a service provider or service providers hosting the images.

In an embodiment, a service provider may act according to a change of auxiliary information including a share statement linked to one or more digital identifiers of an image. After a user has uploaded an image to the service provider, the service provider may (1) encode the image with one or more digital identifiers, thereby creating an encoded image, (2) create one or more digital identifier keys of said encoded image as a function of the one or more digital identifiers, (3) create auxiliary information, the auxiliary information including at least a share statement, (4) link the auxiliary information to the one or more digital identifier keys, (5) send the one or more digital identifier keys and auxiliary information to a server system. The service provider receiving a request for a change of the share statement linked to the one or more digital identifier keys from the user may cause the service provider to (1) change the share statement linked to the one or more digital identifier keys, and (2) act according to the share statement.

Note that in an embodiment, the service provider may ensure that the image is encoded with a digital identifier by performing the necessary steps as described above. The service provider will thereby enable the user to be able to change the share statement at a later time.

In an embodiment, a sender device may comprise a communication module and an encoding module that is adapted to encode an image with one or more digital identifiers and to provide a digital identifier key. The sender device may also perform the following when capturing an image: (1) encode the image with one or more digital identifiers, thereby creating an encoded image, (2) create one or more digital identifier keys of the encoded image as a function of the one or more digital identifiers, (3) create auxiliary information that includes at least a share statement, (4) link the auxiliary information to the one or more digital identifier keys, and (5) send the one or more digital identifier keys and auxiliary information to the server system. The server system stores the one or more digital identifier keys and auxiliary information. In this embodiment, an image or images are being encoded without the image ever being shared. However, the server system will still build a registry comprising of digital identifier keys linked to auxiliary information. Thus, in the case that the sender device is hacked, the owner or user of the sender device may still use the digital identifiers to send takedown notices to various service providers.

Figure 1:
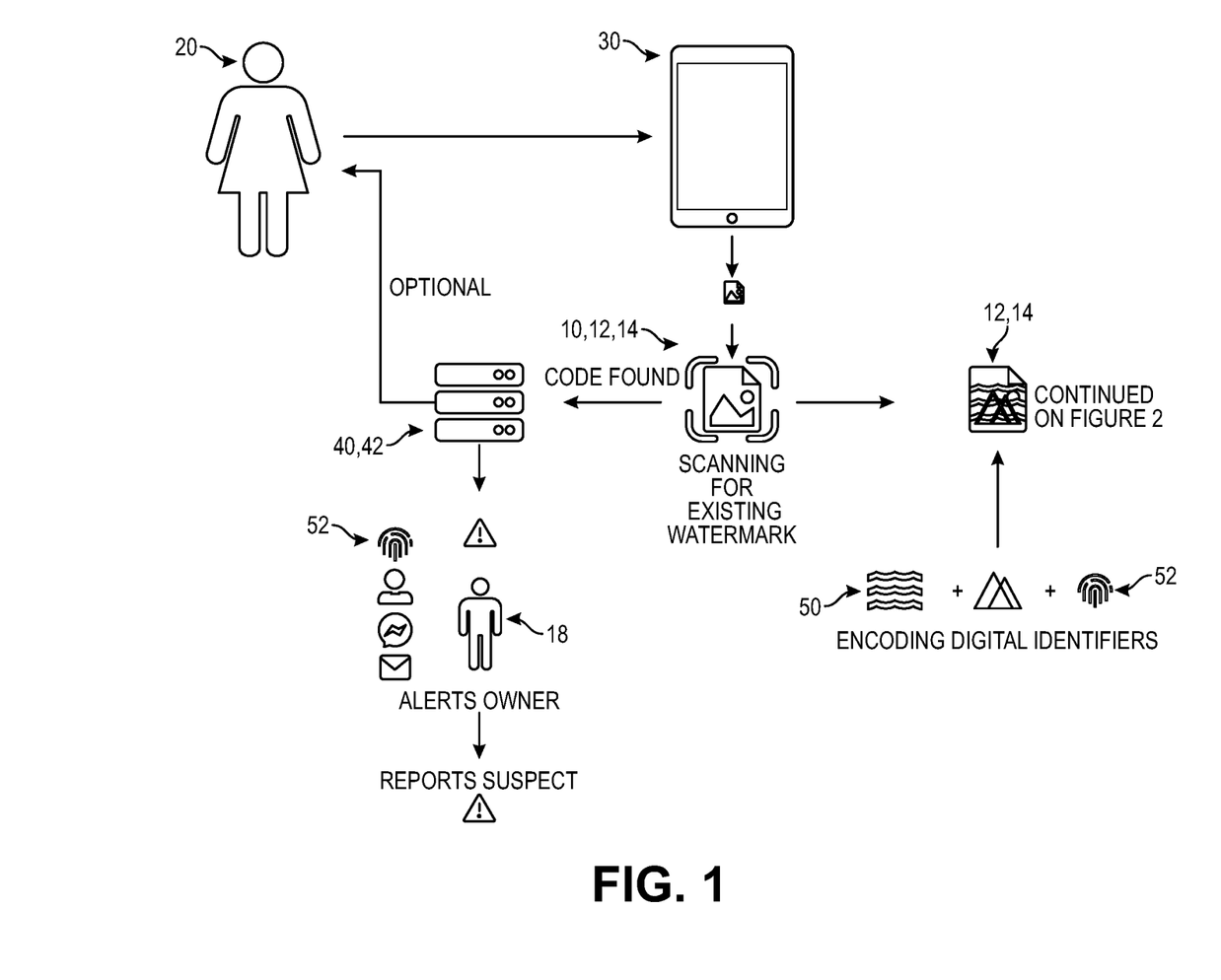
FIGS. 1 and 2 are illustrations of a user uploading an image via a sender device to a recipient in accordance with an embodiment of the invention.
Figure 2:
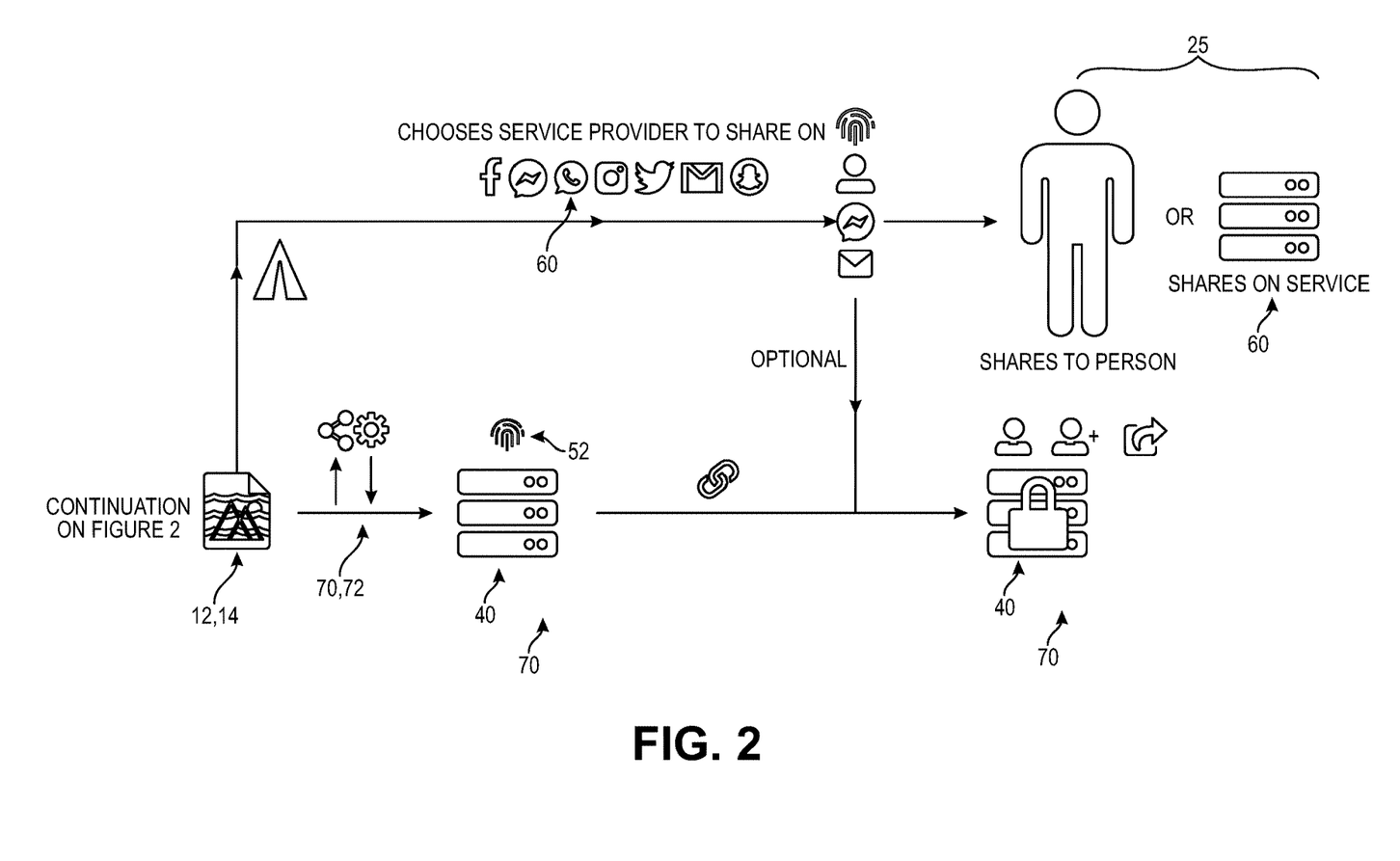
Figure 10:
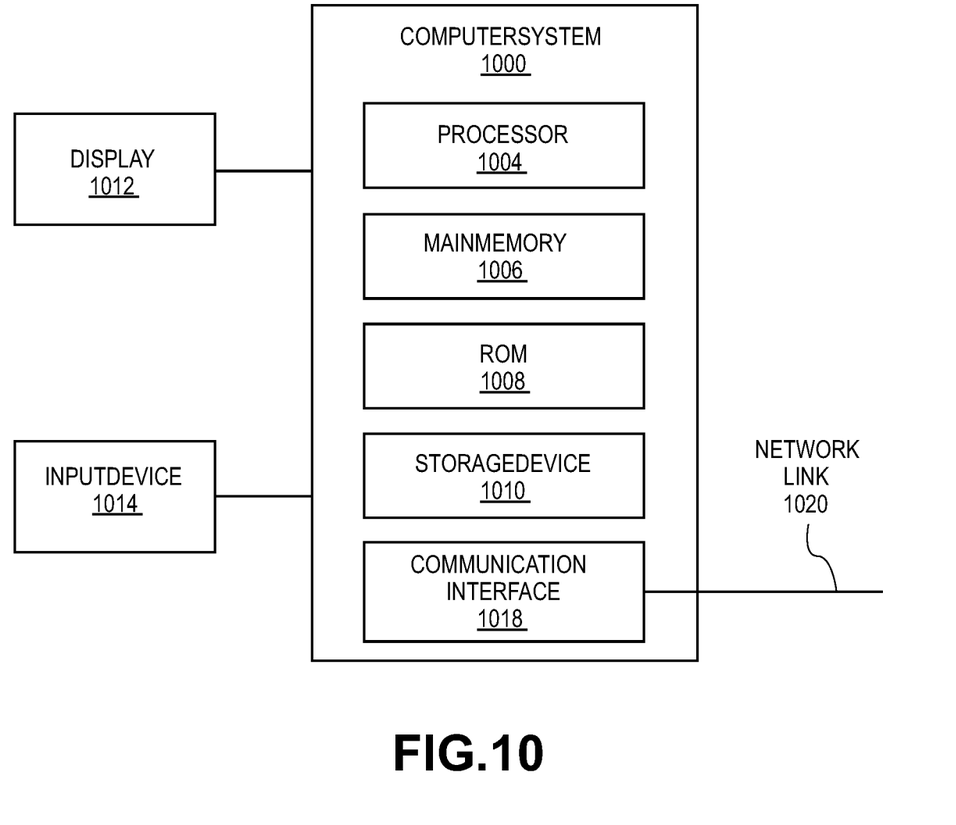
FIG. 10 is a block diagram of a computer system which may implement, at least in part, a sending device, server system, and/or a service provider in accordance with an embodiment of the invention.

FIGS. 1 and 2 are illustrations of a user 20 uploading an image 10 via a sender device 30 to a recipient 25 in accordance with an embodiment of the invention. Sender device 30, as broadly used herein, refers to any mechanized device capable of sending a selected digital image to another entity. A sender device 30 may be implemented on a computer system as shown in FIG. 10.

As shown in FIG. 1, upon user 20 initiating an upload of the image 10 using sender device 30, sender device 30 may search or scan the image 10 being uploaded or a digital identifier 50. According to an embodiment, upon sender device 30 conclusively finding digital identifier 50 in the image, sender device 30 causes the image 10 to be sent to a server system 40 as an encoded image 12 or a recipient-unique encoded image 14. In an alternate embodiment, sender device 30 may cause the image 10 to be sent to the server system 40 as an encoded image 12 or a recipient-unique encoded image 14 if sender device 30 deems that digital identifier 50 may be encoded in image 10.

Server system 40 comprises a registry 42. Registry 42 comprises a plurality of digital identifier keys 52 that are linked to auxiliary information 70. Server system 40 may search the encoded image 12, 14 for encoded digital identifiers 50 as a function of the plurality of digital identifier keys 52.

If digital identifier 50 is found based on a digital identifier key 52, then the auxiliary information 70 linked to digital identifier key 52 may enable the server system 40 to send a warning to an owner 18 of the encoded image 12, 14. If the image is determined to be a recipient-unique encoded image 14, the owner 18 may decide to take legal actions against the recipient 25 who received the recipient-unique encoded image 14.

If the image 10 contains no digital identifiers 50, then the sender device 30 may encode the image 10 with one or more digital identifiers 50 and/or one or more recipient-unique digital identifiers 50, thereby creating an encoded image 12 or a recipient-unique encoded image 14. Then, sender device 30 may also create one or more digital identifier keys 52 of encoded image 12 or recipient-unique encoded image 14 as a function of the one or more digital identifiers 50.

As shown in FIG. 2, sender device 30 may create auxiliary information 70 to include at least a share statement 72. The auxiliary information 70 may be based on user input. The one or more digital identifier keys 52 and the auxiliary information 70 are sent to and stored on the server system 40. Server system 40 comprises an at least partly public registry 42, which contains digital identifier keys 52 linked to the share statements 72 such that a requester may be informed whether an image may be shared or not.

In an embodiment, server system 40 may comprise a secured registry (indicated in FIG. 2 by the lock) containing auxiliary information 70 that enables the owner of the encoded image 12 to be contacted or may contain information enabling identification of the recipient 25.

The encoded image 12, 14 may afterwards be uploaded to the recipient 25 by a variety of means, such as through varies service providers 60. Non-limiting, illustrative examples of service providers 60 include Facebook, Messenger, WhatsApp, Instagram, Twitter, Gmail, and Snapchat.

The recipient 25 may be a natural person or a legal person such as a service provider 60. The recipient 25 may cause the encoded image to become publicly available regardless of whether the recipient is a natural person or a legal person.

Figure 3:
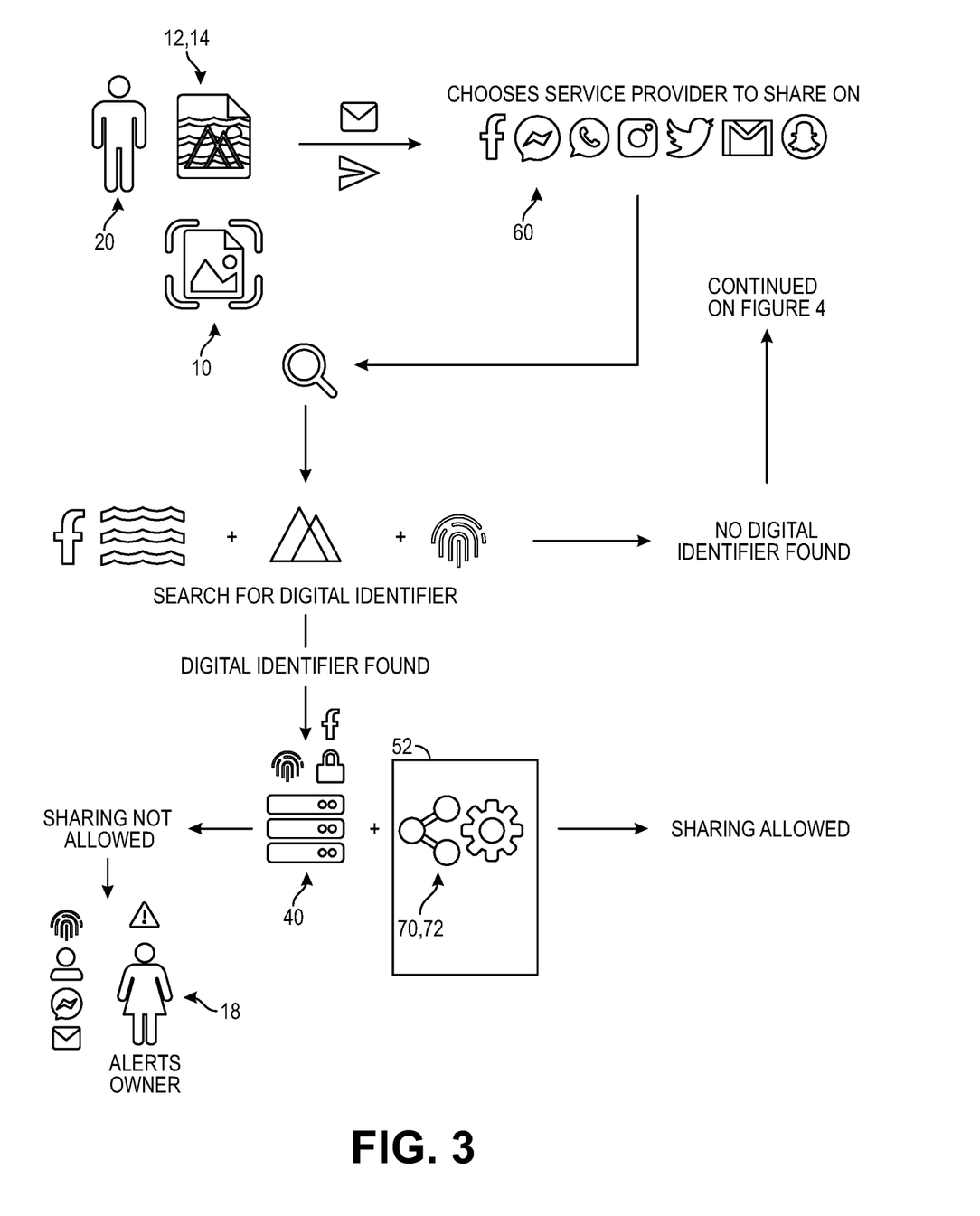
FIGS. 3 and 4 are illustrations of a user uploading an image to a service provider in accordance with an embodiment of the invention.
Figure 4:
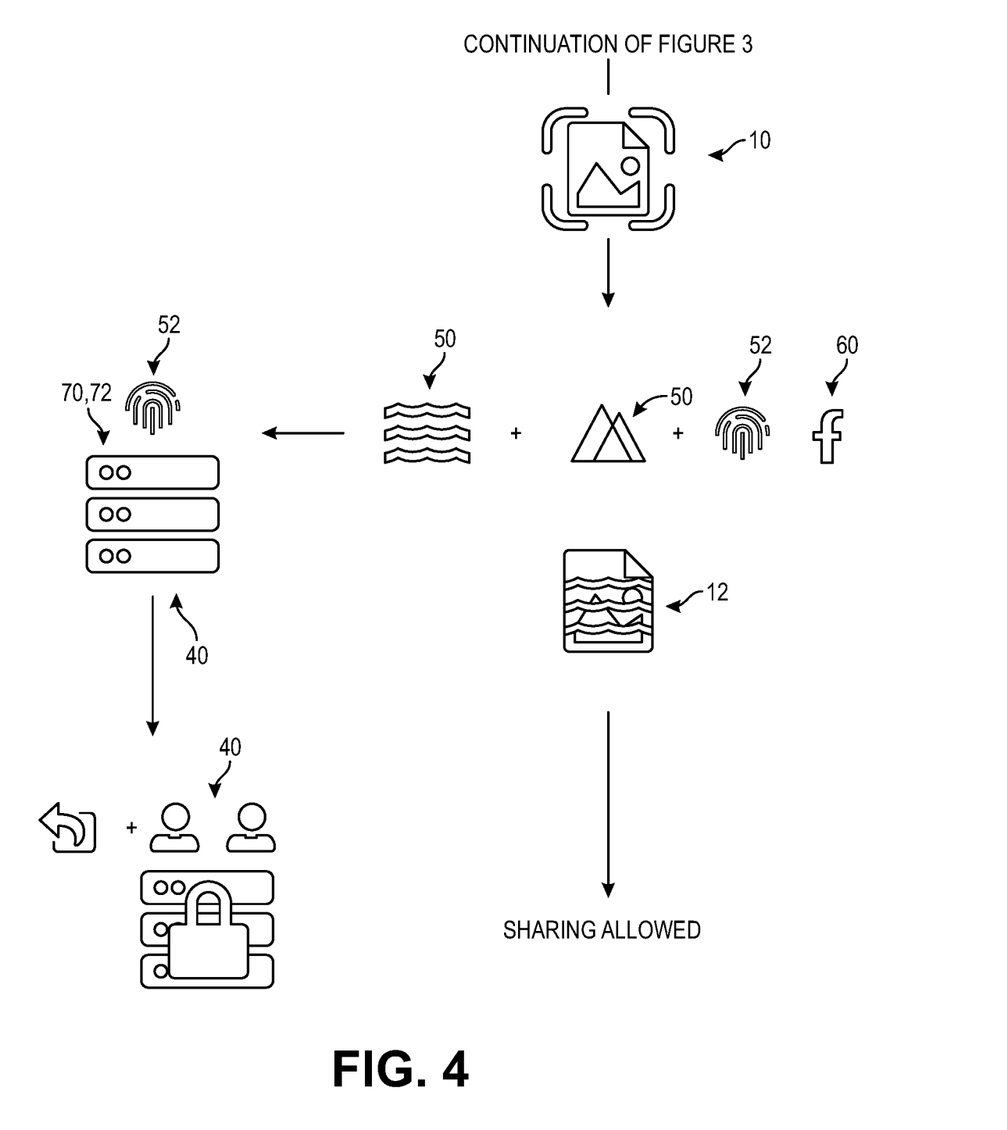

FIGS. 3 and 4 are illustrations of a user 20 uploading an image 10 to a service provider 60 in accordance with an embodiment of the invention. As shown in FIG. 3, service providers 60 may include one or more of Facebook, Messenger, WhatsApp, Instagram, Twitter, Gmail, and Snapchat.

An individual service provider 60 may not know whether the image 10 contain digital identifiers or whether the user 20 is sharing a confidential image being an encoded image 12 or a recipient-unique encoded image 14.

By an embodiment, the service provider 60 may perform a search on a particular image 10 for a digital identifier 50 or may request that server system 40 searches for a digital identifier as a function of the stored digital identifier keys 52.

If a digital identifier 50 is found for a particular image 10 based on a digital identifier key, then the share statement is checked and the encoded image 12, 14 may be shared if the share statement 72 allows for sharing or the encoded image 12, 14 may not be shared if the share statement 72 does not allow sharing. Depending on the other parts of the auxiliary information 70 linked to the digital identifier key 52, then the owner 18 of the encoded image 12, 14 may be warned/notified.

As shown in the embodiment of FIG. 4, if a digital identifier is not found encoded in a particular image 10, then the service provider 60 may encode the image 10 with one or more digital identifiers 50, thereby creating an encoded image 12, and the service provider 60 may create one or more digital identifier keys 52 of the encoded image 12 as a function of the one or more digital identifiers 50.

The service provider 60 may then create auxiliary information 70 including at least a share statement 72. The one or more digital identifier keys and the auxiliary information 70 are sent to and stored at server system 40. The server system 40 comprises an at least partly public registry 42 containing digital identifier keys linked to the share statements 72 such that a requester may be informed whether the image 12 may be shared or not. The service provider 60 may then share the encoded image 12.

Figure 5:
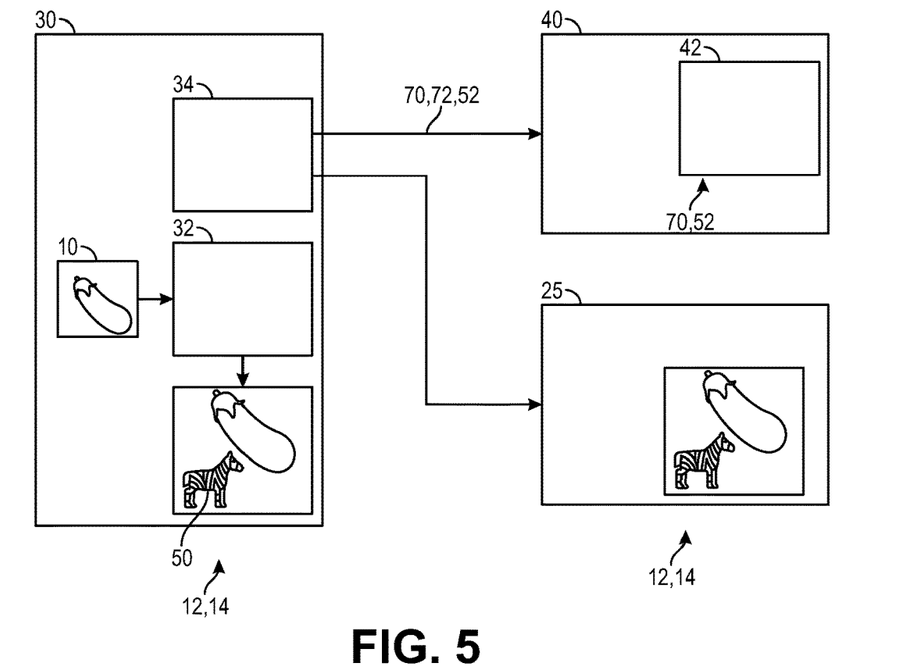
FIG. 5 is a block diagram of a system according to the invention in accordance with an embodiment of the invention.

FIG. 5 is an illustration of a system according to an embodiment of the invention. Note that while recipient 25 is shown in FIG. 5, recipient 25 is not part of the system. The system of FIG. 5 comprises at least one sender device 30 and a server system 40. Sender device 30 comprises a communication module 34 for communicating with recipient 25 and server system 40.

Sender device 30 also comprises an encoding module 32 adapted to encode an image 10 with one or more digital identifiers 50 and to provide a digital identifier key 52 (not shown). Image 10 as shown in FIG. 5 is of an eggplant. In the present example, the encoded image 12 contains a digital identifier 50 in the form of a zebra watermark. Digital identifier 50 will typically be designed to be invisible for the human eye.

In an embodiment, sender device 30 is configured to perform the following when capturing an image 10 or when sending an image 10 or when prompted by a user input: (1) encoding the image 10 with one or more digital identifiers 50, thereby creating an encoded image 12, (2) creating one or more digital identifier keys 52 of the encoded image 12 as a function of the one or more digital identifiers 50, (3) creating auxiliary information 70, the auxiliary information including at least a share statement 72, (4) linking the auxiliary information 70 to the one or more digital identifier keys 52, and (5) sending the one or more digital identifier keys 52 and auxiliary information 70 to the server system 40.

The server system 40 comprising a registry 42 containing a plurality of digital identifier keys 52 linked to auxiliary information 70. The purpose of the digital identifier keys 52 is to enable faster recognition of digital identifiers 50 in an image 50, while at the same time link the digital identifiers 50 of an image 10 with auxiliary information 70 including at least a share statement 72.

Figure 6:
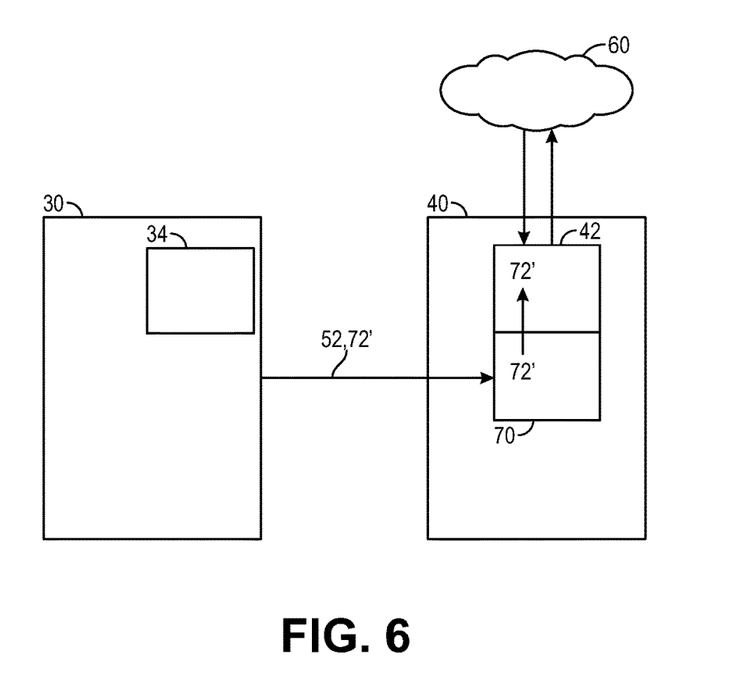
FIG. 6 is a block diagram of a service provider requesting a share statement and a sender requesting a change in the share statement in accordance with an embodiment of the invention.

FIG. 6 is an illustration of a service provider 60 requesting a share statement 72 and a sender device 30 requesting a change in the share statement 72 to 72' in accordance with an embodiment. The server system 40 comprising a registry 42 containing a plurality of digital identifier keys 52 (not shown) linked to auxiliary information 70. In an embodiment, server system 40 is configured to perform the following when receiving a request image from a requester, which in this embodiment is the service provider 60, (1) searching the requested image 10 for encoded digital identifiers 50 as a function of the plurality of digital identifier keys 52, and (2) sending at least the share statement 72 linked to the digital identifier key 52 to the requester being service provider 60. The sender device 30 requests that the share statement linked to digital identifier key 52 is changed to share statement 72', which may be "sharing not allowed" or "sharing allowed." The system server 40 will thereafter provide the share statement 72' for the digital identifier key 52.

Figure 7:
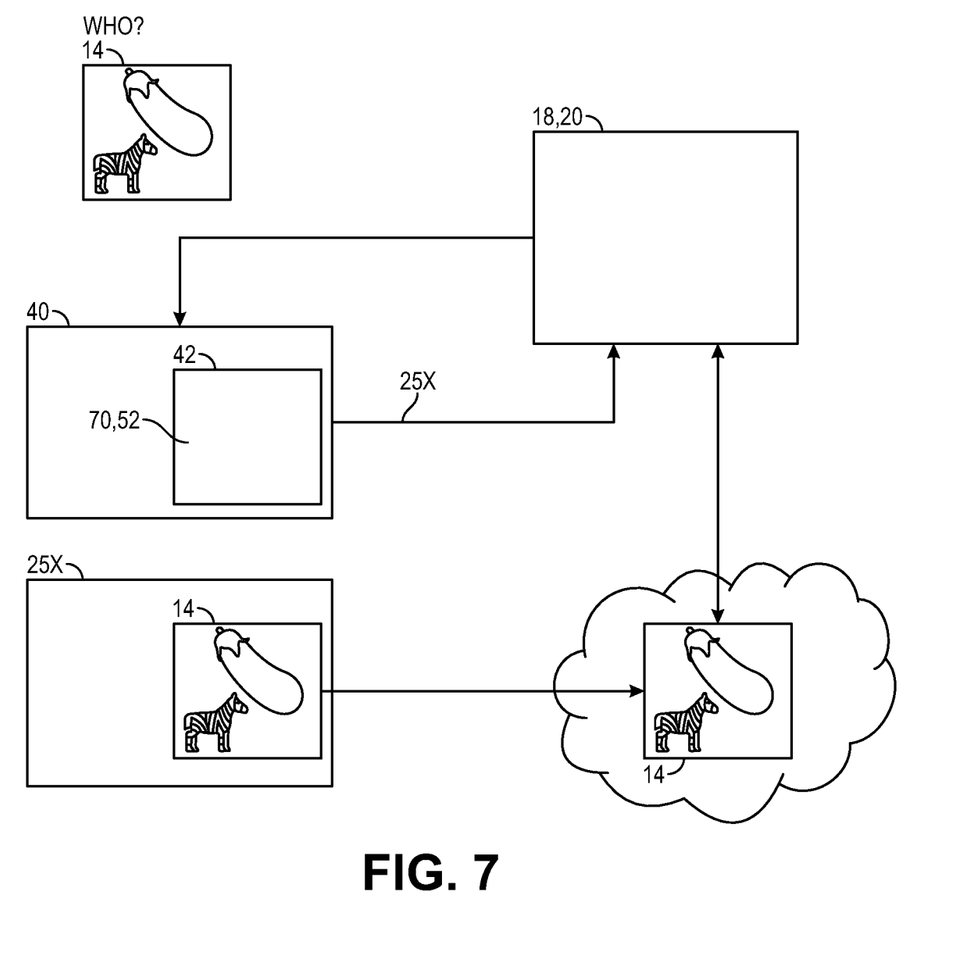
FIG. 7 is an illustration of an owner or user requesting information of the recipient who has leaked a recipient-unique encoded image in accordance with an embodiment of the invention.

FIG. 7 is an illustration of an owner 18 or user 20 requesting information of the recipient 25, who has leaked a recipient-unique encoded image 14, in accordance with an embodiment of the invention. In the example shown in FIG. 7, recipient 25X has leaked the recipient-unique encoded image 14 to the Internet represented by the cloud. The owner 18 or user 20 has found the image 14 and requested the system server 40 for the recipient 25 of the recipient-unique encoded image 14, which the system server 40 is able to provide as the recipient 25X. The owner 18 or user 20 may then instigate appropriate legal proceedings, such as copyright violations, against recipient 25X.

Figure 8:
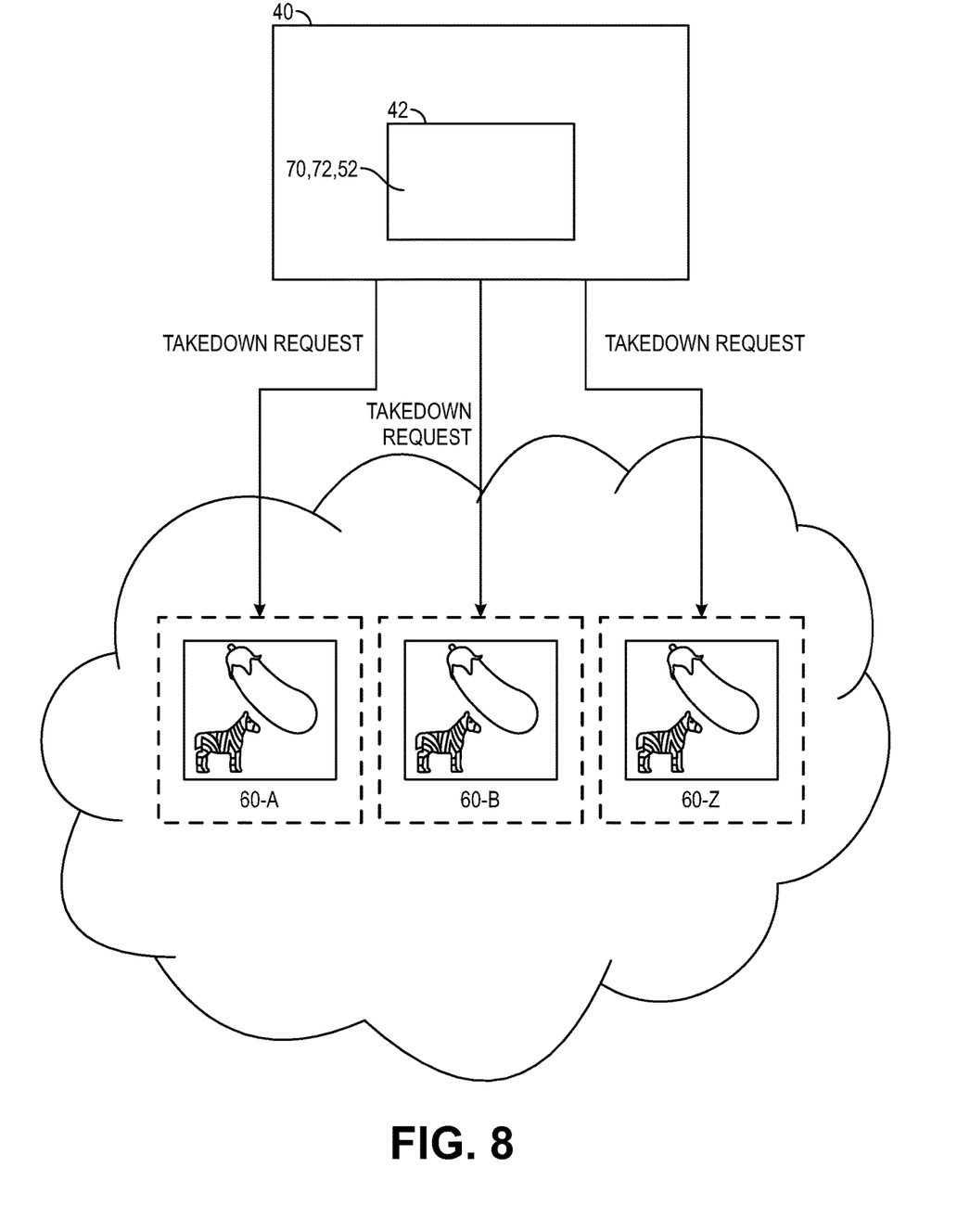
FIG. 8 is an illustration of a server system sending takedown request to service provider A . . . Z in accordance with an embodiment of the invention.

FIG. 8 is an illustration of a server system 40 sending a takedown request to service provider 60A . . . Z in accordance with an embodiment of the invention. The server system 40 crawls the webpages and publicly accessible network data of service providers 60A . . . Z in search of digital identifiers 50 linked to a digital identifier key 52.

Figure 9A:
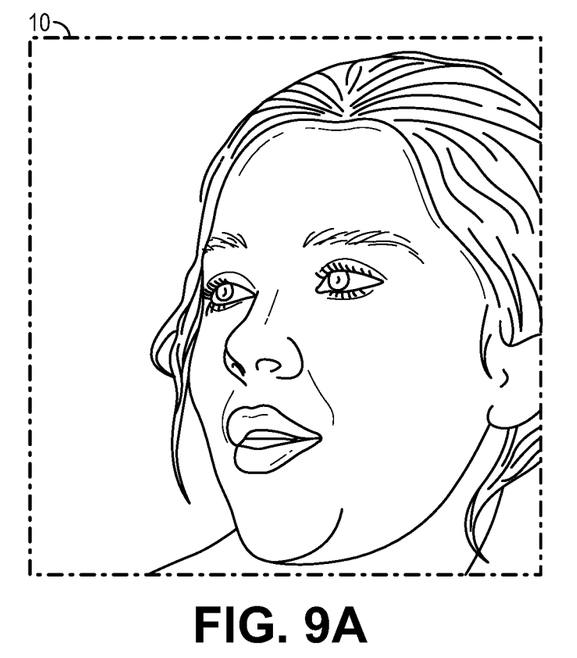
FIG. 9A is an illustration of an image without a digital identifier in accordance with an embodiment of the invention.
Figure 9B:
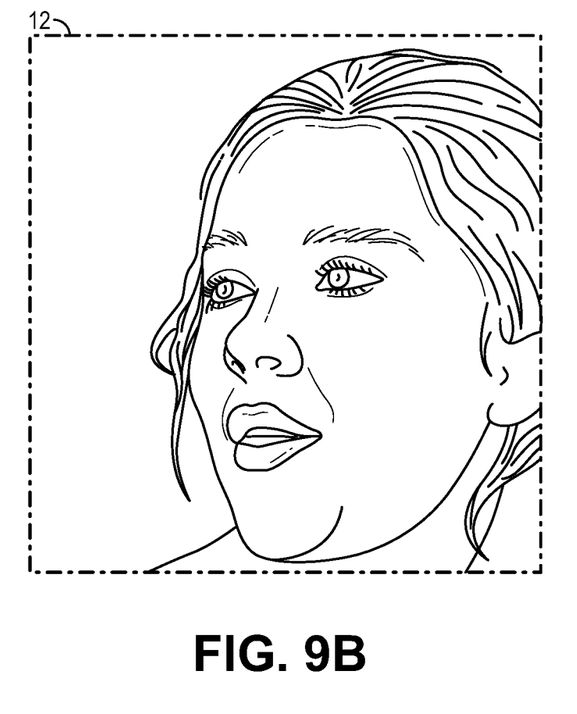
FIG. 9B is an illustration of an image with a digital identifier in accordance with an embodiment of the invention.

FIG. 9A is an illustration of an image 10 without a digital identifier in accordance with an embodiment of the invention. FIG. 9B is an illustration of an image 12 with a digital identifier in accordance with an embodiment of the invention. Image 12 depicted in FIG. 9B possesses a 128-bit digital identifier.

FIG. 10 is a block diagram of a computer system which may implement, at least in part, a sending device, server system, and/or a service provider in accordance with an embodiment of the invention. In an embodiment, computer system 1000 includes processor 1004, main memory 1006, ROM 1008, storage device 1010, and communication interface 1018. Computer system 1000 includes at least one processor 1004 for processing information. Computer system 1000 also includes a main memory 1006, such as a random-access memory (RAM) or other dynamic storage device, for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device for storing static information and instructions for processor 1004. A storage device 1010, such as a magnetic disk or optical disk, is provided for storing information and instructions.

Embodiments of the invention are related to the use of computer system 1000 for implementing the techniques described herein. According to one embodiment of the invention, those techniques are performed by computer system 1000 in response to processor 1004 executing one or more sequences of one or more instructions contained in main memory 1006. Such instructions may be read into main memory 1006 from another machine-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory computer-readable storage medium" as used herein refers to any tangible medium that participates in storing instructions which may be provided to processor 1004 for execution. Non-limiting, illustrative examples of non-transitory machine-readable media include, for example, a solid-state device, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of non-transitory computer-readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a network link 1020 to computer system 1000.

Communication interface 1018 provides a two-way data communication coupling to a network link 1020 that is connected to a local network. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic, or optical signals that carry digital data streams representing various types of information.

Network link 1020 typically provides data communication through one or more networks to other data devices. For example, network link 1020 may provide a connection through a local network to a host computer or to data equipment operated by an Internet Service Provider (ISP).

Computer system 1000 can send messages and receive data, including program code, through the network(s), network link 1020 and communication interface 1018. For example, a server might transmit a requested code for an application program through the Internet, a local ISP, a local network, subsequently to communication interface 1018. The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. A system for managing shares of a digital image by providing auxiliary information linked to said image encoded with one or more digital identifiers, comprising:
   at least one sender device comprising:
      a communication module; and
      an encoding module adapted to (a) encode the image with the one or more digital identifiers and (b) create one or more digital identifier keys, wherein the at least one sender device is configured to perform the following:
         acquire or retrieve the image, and,
         after acquiring or retrieving the image, and for a share of the image, during the process of uploading the image to a recipient, perform the following steps per-image-share:
            (a) encode the image with one or more image-share-specific digital identifiers, thereby creating an image-share-specific encoded image for the specific share,
            (b) create one or more image-share-specific digital identifier keys of said image-share-specific encoded image as a function of the one or more image-share-specific digital identifiers,
            (c) create image-share-specific auxiliary information, the image-share-specific auxiliary information including at least a share statement for the specific share of the image,
            (d) link the image-share-specific auxiliary information to the one or more image-share-specific digital identifier keys,
            (e) send the one or more image-share-specific digital identifier keys and image-share-specific auxiliary information to a server system, and
            (f) send the image-share-specific encoded image to the recipient for the specific share of the image; and
   the server system comprising a registry, wherein said registry comprises a plurality of digital identifier keys linked to auxiliary information, wherein the server system performs the following when receiving a request image from a requester:
      (a) search the request image for encoded digital identifiers as a function of the plurality of digital identifier keys, and
      (b) send at least the share statement linked to the digital identifier key to the requester,
   wherein the image is shared two or more times and each shared image contain image-share-specific digital identifiers different from the other image-share-specific digital identifiers.

2. The system of claim 1, wherein the image-share-specific auxiliary information further includes one or more of the following: (a) a recipient identifier (ID) identifying the recipient for a particular image share, (b) contact details of the recipient, (c) a sender identifier (ID), (d) contact details of the sender, and (e) user names or handles to one or more social medias linked to the sender device.

3. The system of claim 1, wherein the recipient is a service provider and the image-share-specific encoded image is made publicly available at the service provider.

4. The system of claim 1, wherein the system is configured to link the recipient to a confidential image encoded with one or more image-share-specific digital identifiers, wherein encoding the image with one or more image-share-specific digital identifiers includes encoding the image with one or more recipient-unique digital identifiers, thereby creating a recipient-unique encoded image, and wherein said auxiliary information includes recipient identifier (ID) enabling identification of the recipient.

5. The system of claim 4, wherein the sender device is configured to receive user input about one or more areas of the image, and wherein the step of encoding the image with one or more image-share-specific digital identifiers includes encoding one or more image-share-specific digital identifiers in said one or more areas of the image.

6. The system of claim 1, wherein the one or more image-share-specific digital identifier keys enable identification of at least one or more of: metadata of the image, a human-visible watermark encoded in the image, a Discrete Wavelet Transform (DWT) watermark encoded in the image, and a Discrete Cosine Transform (DCT) watermark encoded in the image.

7. The system of claim 1, wherein the server system performs changing the image-share-specific auxiliary information linked to one or more image-share-specific digital identifiers as a function of a request from an owner of the sender device.

8. A method for processing a share statement linked to an image uploaded thereto, comprising:
   the service provider sending the image to a server system having a registry with a plurality of one or more image-share-specific digital identifier keys linked to image-share-specific auxiliary information including at least the share statement for a specific image share;
   the server system searching in the image for one or more image-share-specific encoded digital identifiers as a function of the one or more image-share-specific digital identifier keys; and
   the service provider receiving, from the server system, at least the share statement for a specific image-share of the image upon identifying an image-share-specific digital identifier of said one or more an image-share-specific encoded digital identifiers,
   wherein the image is shared two or more times and each shared image contain image-share-specific digital identifiers different from the other image-share-specific digital identifiers.

9. The method according to claim 8, wherein the server system performs as a function of the image-share-specific auxiliary information linked to the image-share-specific digital identifier alerting a sender having encoded the image with image-share-specific digital identifiers.

10. A method for a service provider to act according to a change of an image-share-specific auxiliary information including a share statement for a specific share of the image with a recipient, the share statement being linked to one or more image-share-specific digital identifiers of the image, where a user has uploaded the image to the service provider, comprising:
  encoding the image with one or more image-share-specific digital identifiers, thereby creating an encoded image for the specific share with a recipient;
  creating one or more image-share-specific digital identifier keys of said image-share-specific encoded image as a function of the one or more image-share-specific digital identifiers;
  creating image-share-specific auxiliary information, the image-share-specific auxiliary information including at least a share statement for the specific share of the image with the recipient;
  linking the image-share-specific auxiliary information to the one or more image-share-specific digital identifier keys; and
  sending the one or more image-share-specific digital identifier keys and the image-share-specific auxiliary information to a server system, and
  upon receiving a request for a change of the share statement linked to the one or more digital image-share-specific identifier keys from the user, causing the share statement linked to the one or more image-share-specific digital identifier keys to be changed, wherein the image is shared two or more times and each shared image contain image-share-specific digital identifiers different from the other image-share-specific digital identifiers.

11. A system for providing auxiliary information linked to an image that, after being captured, is encoded with one or more digital identifiers, comprising
  a server system; and
  at least one sender device comprising a communication module and an encoding module adapted to encode an image with one or more digital identifiers and to provide a digital identifier key, wherein the at least one sender device is configured to perform the following, after capturing an image:
  encoding the image with one or more digital identifiers, thereby creating an encoded image;
  creating one or more digital identifier keys of said encoded image as a function of the one or more digital identifiers;
  creating auxiliary information, the auxiliary information including at least a share statement;
  linking the auxiliary information to the one or more digital identifier keys; and
  sending the one or more digital identifier keys and auxiliary information to the server system,
  wherein the image is shared two or more times and each shared image contain image-share-specific digital identifiers different from the other image-share-specific digital identifiers.

* * * * *